US006914909B2

(12) United States Patent
Van De Voorde et al.

(10) Patent No.: US 6,914,909 B2
(45) Date of Patent: Jul. 5, 2005

(54) METHOD TO DIVIDE UPSTREAM TIMESLOTS IN A TIME DIVISION MULTIPLE ACCESS SYSTEM, RELATED LINE TERMINATOR AND RELATED NETWORK TERMINATOR

(75) Inventors: Ingrid Zulma Benoit Van De Voorde, Wolvertem (BE); Claire Martin, Ukkel (BE); Hans Slabbinck, Ghent (BE); Peter Johannes Vetter, Antwerp (BE)

(73) Assignee: Alcatel, Paris (FR)

( * ) Notice: Subject to any disclaimer, the term of this patent is extended or adjusted under 35 U.S.C. 154(b) by 799 days.

(21) Appl. No.: 09/737,547

(22) Filed: Dec. 18, 2000

(65) Prior Publication Data

US 2001/0005376 A1 Jun. 28, 2001

(30) Foreign Application Priority Data

Dec. 23, 1999 (EP) .............................. 99403274

(51) Int. Cl.[7] .............................................. H04B 7/212
(52) U.S. Cl. .................... 370/442; 370/458; 370/465
(58) Field of Search .............................. 370/395.1, 432, 370/442, 443, 458, 465, 422, 468

(56) References Cited

U.S. PATENT DOCUMENTS

| 5,648,958 A | * | 7/1997 | Counterman ................ 370/458 |
| 5,966,163 A | * | 10/1999 | Lin et al. .................... 725/117 |
| 6,298,049 B1 | * | 10/2001 | Vanhoof et al. ............ 370/329 |
| 6,320,869 B1 | * | 11/2001 | Van Driel et al. .......... 370/443 |
| 6,434,154 B1 | * | 8/2002 | Stacey et al. ............. 370/395.64 |
| 6,463,075 B1 | * | 10/2002 | Hoebeke ..................... 370/458 |

FOREIGN PATENT DOCUMENTS

EP 0 854 659 A1 7/1998

OTHER PUBLICATIONS

ITU–T Recommendation G/983.1 (Oct. 1998) Section 8.3.5.
"Delay priorities enhance utilisation of ATM PON access systems" by J. D. Angelopoulos, G. C. Boukis, and I. S. Venieris, Computer Communications 20, (1997), pp. 937–949.

* cited by examiner

*Primary Examiner*—Ricky Ngo
*Assistant Examiner*—Nittaya Juntima
(74) *Attorney, Agent, or Firm*—Sughrue Mion, PLLC

(57) ABSTRACT

A method to divide upstream timeslots in a multiple access system that couples a line terminator via a tree-like network to a plurality of network terminators and the line terminator distributes downstream data packets to the plurality of network terminators. The line terminator includes a grant, associated with one of the network terminators, in the downstream packet. A network terminal, upon recognizing its associated grant in the downstream packet, transmits data in a packet placed in a predefined upstream timeslot. Depending on the type of line terminator (high or low order) and the placement of the grant in the downstream packet, the data transmitted by the network terminator, in response to the grant recognition, is placed in a high or low order timeslot for transmission to the line terminator.

12 Claims, 2 Drawing Sheets

METHOD TO DIVIDE UPSTREAM TIMESLOTS IN A TIME DIVISION MULTIPLE ACCESS SYSTEM, RELATED LINE TERMINATOR AND RELATED NETWORK TERMINATOR

BACKGROUND OF THE INVENTION

The present invention relates to a method to divide upstream timeslots in a time division multiple access system and to a related line terminator and a related network terminator.

Similar methods and related network and line terminators are already known in the art, e.g., from the "ITU-T Recommendation G.983.1 (10/198) section 8.3.5". Therein, it is explained how grants should be included in Physical Layer Operation and Maintenance (PLOAM) cells for sending from a line terminator in a Passive Optical Network (PON) system to a plurality of network terminators of the system to indicate to the network terminators what upstream time slot they can use for transmission of data to the line terminator. The systems described in the recommendation are more specifically 155/155 Mbit/sec and 622(downstream)/155 Mbit/sec systems wherein upon recognition of its associated identity in a received grant, a network terminator can use a 155 Mbit/s frame to send upstream data.

In order to support higher rates upstream, the same principle as described above could be used, i.e., sequential allocation of grants in the PLOAM cells to allow network terminators to use 622 Mbit/sec upstream timeslots. However, such a system would not be compatible with a 622/155 Mbit/sec system since the frame structures would not map.

SUMMARY OF THE INVENTION

An aspect of the present invention is therefore to provide a method and a related line terminator and network terminator of the above known type but which would allow graceful upgrade of the existing systems to higher upstream speeds.

According to the invention, this aspect is achieved by means of a method, a line terminator and a network terminator as described hereunder. In accordance with the inventive method, the line terminator includes, at predefined location in a downstream data packet, a grant associated with one of the plurality of network terminators and the line terminator distributes the downstream packet. Each one of the network terminators transmits an upstream data packet in a predefined upstream timeslot in response to reception and recognition of its associated grant. The transmitting step comprises transmitting an upstream data packet in a lower order timeslot if the network terminator is a lower order network terminator and the predefined location is a predefined first location associated with non-idle grants. The transmitting step further comprises transmitting an upstream data packet in one of a plurality of higher order timeslots if the network terminator is a higher order network terminator and the predefined location is a predefined first location associated with non-idle grants. The higher order timeslots comprise a predefined number of higher order subslots included in the predefined upstream timeslot. The upstream data packet is transmitted in the higher order timeslot if the network terminator is a higher order network terminator and the predefined location is a predefined second location associated with idle grants.

The inventive line terminator distributes downstream data packets to a plurality of network terminators and comprises an insertion device that includes, in a downstream data packet at a predefined first location, a grant associated with one of the plurality of network terminators. If a network terminator is a higher order network terminator, the insertion device includes, at a predefined second location of the downstream data packet, a grant which is associated with the one of the plurality of network terminators.

The inventive network terminator comprises a detector that recognizes the grant associated with the network terminator in a downstream packet sent from a line terminator to the network terminator. The network terminator further comprises a transmitter for transmitting a data packet in a predefined upstream timeslot upon recognition of the associated grant, wherein the network terminator is adapted to transmit upstream data packets at a higher order data packet rate. The detector is further adapted to recognize the associated grant at a predefined first location in the downstream data packet and the transmitter is adapted, upon recognition by the deteector of the associated grant, to transmit a data packet in one of a plurality of higher order timeslots. The higher order timeslots comprise a predefined number of higher order subslots included in the predefined upstream timeslot. The detector is further adapted to recognize the associated grant at a predefined second location in the downstream data packet and the transmitter is further adapted, upon recognition of the associated grant by the detector at the predefined second location in the downstream data packet, to transmit the data packet in a the higher order timeslot.

In the above description, network terminators transmitting at higher speed, e.g., 622 Mbit/sec., are called higher order network terminators and network terminators sending at lower upstream speed, e.g., 155 Mbit/sec, are called lower order network terminators.

Indeed, by, in case of higher order network terminators, using in addition to the normally available grants, i.e., grants located at a predefined first place, called non-idle grants in the above Recommendation, additional grants, i.e., grants located at a predefined second place, in the above Recommendation called idle grants, and by adequately subdividing the existing upstream timeslots in subslots, higher rates can be supported whilst still being able to support the lower order network terminators. For example, in the case of a combination of a 622/155 Mbit/sec and a 622/622 Mbit/sec system, the network terminators sending at the former speed will upon receipt of a grant located at the predefined first place (non-idle grant place) use the complete 155 Mbit/sec upstream frame, whilst in the latter system, the network terminators upon receipt of a grant located either at a predefined first or at a predefined second place (idle grant place) will use a subframe being one-fourth of the 155 Mbit/sec one.

Upstream frames used by lower order network terminators are called lower order timeslots, whilst slots used by a higher order network terminator are called higher order timeslots, these slots being in fact subslots stream slots having the size of lower order timeslots.

It should further be noticed that the term "including", used in the claims, should not be interpreted as being limitative to the means listed thereafter. Thus, the scope of the expression "a device including means A and B" should not be limited to devices consisting only of components A and B. It hat with respect to the present invention, the only relevant components vice are A and B.

BRIEF DESCRIPTION OF THE DRAWINGS

The above and other aspects and features of the invention will become more apparent and the invention itself will be best understood by referring to the following description of an embodiment taken in conjunction with the accompanying drawings wherein.

DETAILED DESCRIPTION OF THE INVENTION

Figure 1:
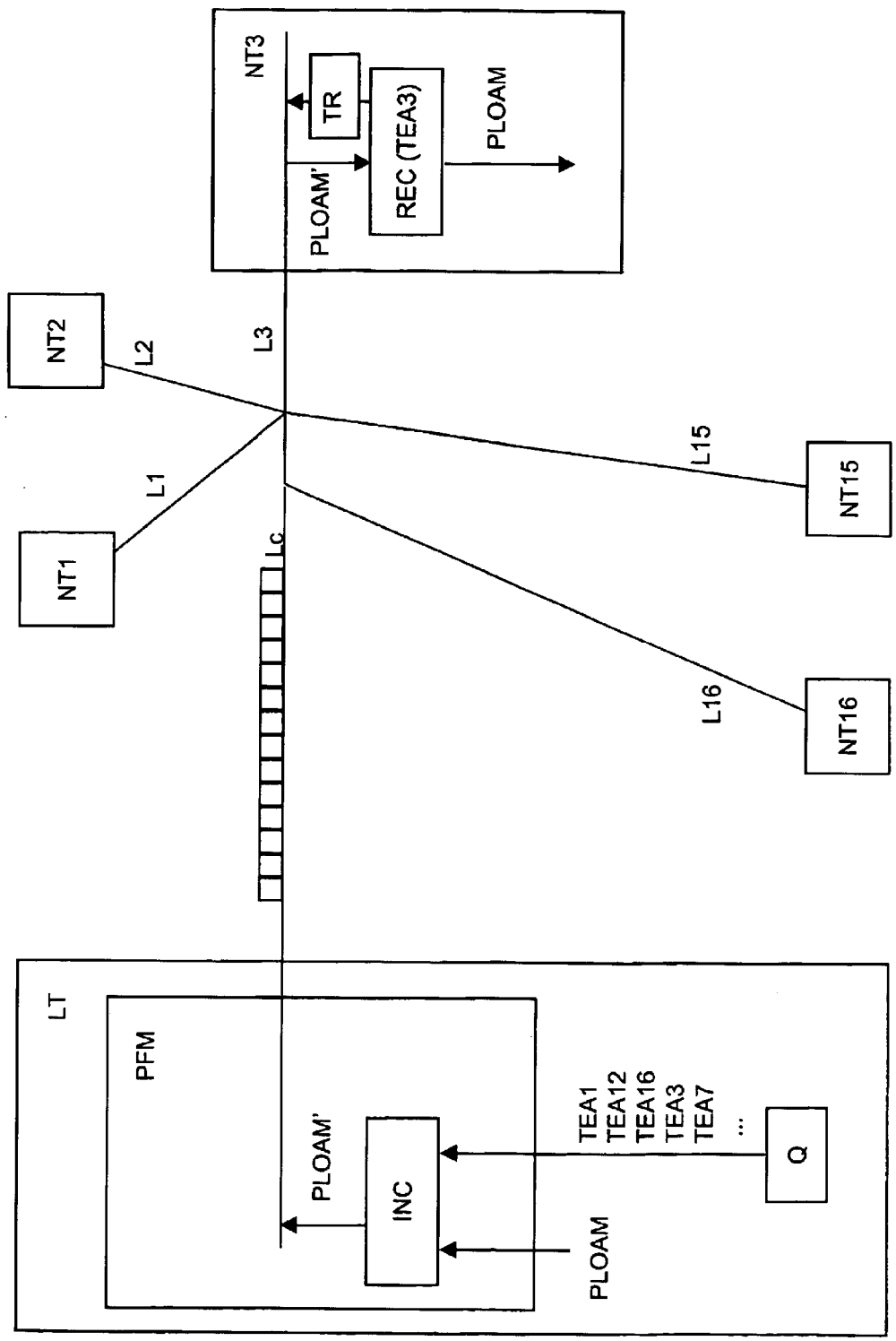
FIG. 1 shows a block scheme of an embodiment of a time division multiple access network wherein the method of the invention is used.

Referring to FIG. 1, a method to divide upstream timeslots used in a time division multiple access network in order to support 622/1155 Mbit/sec as well as 622/622 Mbit/sec will be described. The working of the time division multiple access network will be explained by means of a functional description of the blocks shown in FIG. 1. Based on this description, implementation of the functional blocks in FIG. 1 will be obvious to a person skilled in the art and will therefor not be described in detail.

The time division multiple access network includes a line terminator LT and a plurality of network terminators NT1, NT2, NT3, . . . , NT15, NT16. The line terminator LT is coupled to each network terminator NT1, NT2, NT3, . . . , NT15, NT16 via the cascade connection of a common transmission link Lc and an individual user link L1, L2, L3, . . . , L15, L16.

For example, the time division multiple access network could be an optical network transporting asynchronous transfer mode ATM cells over optical fibers from the line terminator LT to the network terminators NT1, NT2, NT3, . . . , NT15, NT16. The time division multiple access network broadcasts network terminator identities, e.g., TEA1, TEA12, TEA16, TEA3, TEA7, . . . or grants in downstream information packets from the line terminator LT to the plurality of network terminators NT1, NT2, NT3, . . . , NT15, NT16. Upon recognition of its associated identity, a network terminator is allowed to transfer a predetermined amount of upstream information packets in predetermined upstream timeslots to the line terminator LT. For example, upon recognition by network terminator NT3 of its associated identity TEA3 in a downstream information packet, network terminator NT3 is allowed to send to the line terminator upstream information packets in predetermined timeslots.

The line terminator LT includes a packet formatting module PFM, inclusion means INC and queuing means Q. The queuing means Q is coupled to the inclusion means INC, which is included following this embodiment in the packet formatting module PFM.

Each network terminator, whereof only network terminator NT3 is shown in detail in order not to overload FIG. 1, includes recognition means REC and transmitting means TR.

The functions of each functional blocks of above will be described in the following paragraphs.

The line terminator allocates the time slots in a flexible and dynamically way. Indeed the upstream transfer capacity of the time division multiple access network is shared amongst the network terminators NT1, NT2, NT3, . . . , NT15, NT16 based on their needed and requested upstream bandwidth to transmit upstream information. This needed upstream bandwidth is requested by the network terminators NT1, NT2, NT3, . . . , NT15, NT16 to the line terminator LT.

The requested bandwidth is translated by the line terminator LT in a predetermined number of allocated timeslots. This is realized by creating according the requested bandwidth of the network terminators NT1, NT2, NT3, . . . , NT15, NTS16 a stream of transmit enable addresses or grants which are called in this application substation identities TEA1, TEA12, TEA16, TEA3, TEA7, . . . and which correspond to the grants as specified in ITU-T Recommendation G.983.1. It has to be remarked that the detailed working of this allocation goes beyond the scope of this invention and is therefore not described. A detailed description of this working can be found in the published European patent application with publication number 0 544 975. The aim is the use of the stream of substation identities or grants TEA1, TEA12, TEA16, TEA3, TEA7, . . . to inform the network terminators NT1, NT2, NT3, . . . , NT15, NT16 of the allocated timeslots. Following this embodiment the stream of substation identities or grants TEA1, TEA12, TEA16, TEA3, TEA7, . . . is provided to the inclusion means INC by the queuing means Q.

Physical Layer Operation and Maintenance cells, otherwise known as PLOAM cells, are also provided to the inclusion means INC. The inclusion means INC inserts in the PLOAM cells the grants and the PLOAM cells are then included in the downstream information packets. In order to explain the subject method, assume that network terminator NT2 is a lower order network terminator, i.e., a network terminator sending at 155 Mbit/sec, whilst network terminator NT3 is a higher order network terminator sending at 622 Mbit/sec and that the downstream speed is 622 Mbit/sec.

Figure 2:
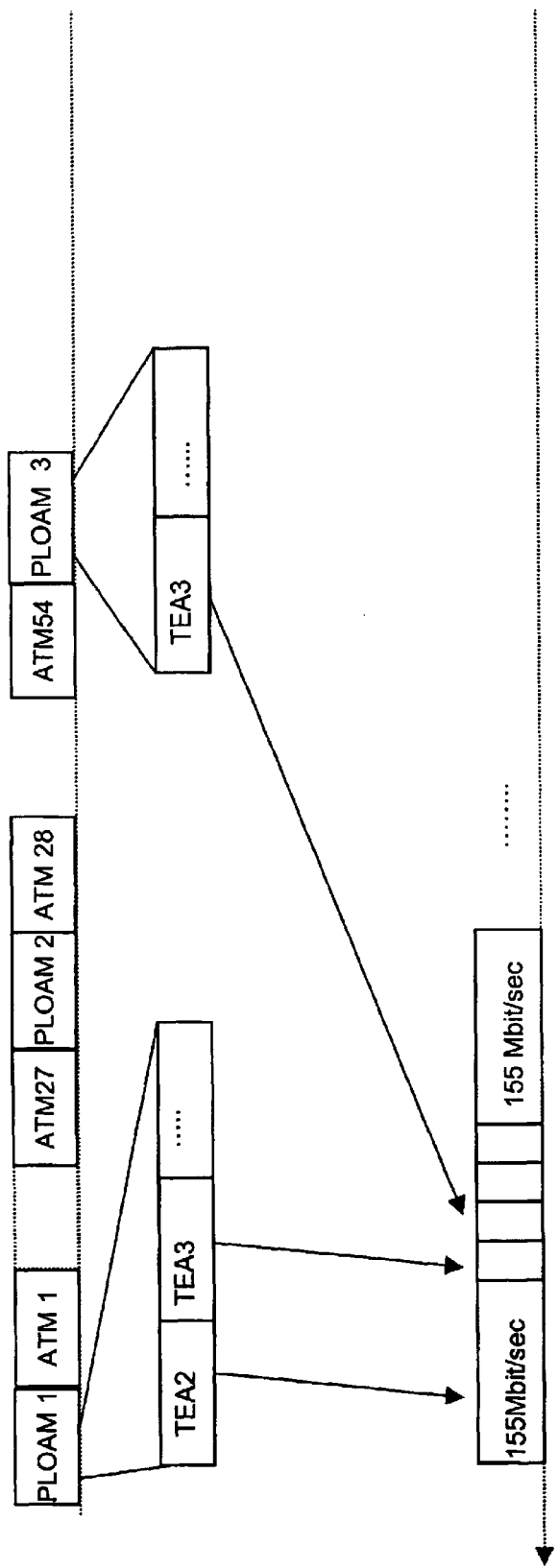
FIG. 2 shows a downstream frame format and an upstream frame format used by the time division multiple access network of FIG. 1.

Referring to FIG. 2, the downstream frame format and the upstream frame format used by the time division multiple access network of FIG. 1 is shown. As it can be seen on FIG. 2, after 27 ATM cells, a PLOAM cell is inserted.

Since NT2 is a lower order network terminator, the inclusion means INC inserts a grant TEA2 for this terminator in PLOAM 1 or PLOAM 2 at the location of non-idle grants as specified in ITU-T Recommendation G.983.1, version 10/98 on pages 39 and 41. It is supposed here as shown in FIG. 2 that at a chosen point in time a grant for NT2 is included in PLOAM 1. Grants for NT3, which is a higher order network terminator, are included at the place of non-idle grants and of idle grants. It is supposed here that grants are inserted in PLOAMS 1 and 3. How many grants are included depends as mentioned earlier on the bandwidth requested by the network terminators. The queuing means Q provides the grants to be included to the including means INC in a sequence that depends on the allocated bandwidth. Since the way in which the number and sequence of allocated grants is determined is outside of the scope of the current invention, this is not explained in detail. Examples of how this is done can be found in the earlier mentioned patent application and in EPA 0854659.

The PLOAM cell, after inclusion of the network terminator grants, is shown in FIG. 1 as PLOAM'. The PLOAM' cell is packed by the packet formatting module PFM into the downstream frame format and distributed to the plurality of network terminators. A network terminator has to recognize its associated identity in a received PLOAM cell in order to be allowed to transfer an upstream information packet. This is realized by the recognition means REC. The sending of the upstream information packets is done by the transmitting means TR. In order not to overload FIG. 1, only for network terminator NT3 are the recognition means RCE(TEA3) and the transmitting means (TR) shown. Taking as example the downstream frame of FIG. 2, NT2 first recognizes its associated identity in a non-idle grant location of PLOAM 1, and being a lower order network terminator, it then transfers an information packet in a 155 Mbit/sec timeslot. The subsequent identity transferred by the line terminator is that of NT3, also in PLOAM 1. Upon recognition of its associated identity in PLOAM 1 and knowing that it is an higher order network terminator, NT3 is allowed to transfer an upstream information packet in a subslot of an 155 Mbit/sec slot being one-fourth thereof. In order not to have gaps in the upstream frames, the line terminator has included a subsequent grant for NT3 in PLOAM 3 at the location of an idle grant. Upon recognition of its identity, NT3 sends an upstream information packet in a subsequent subslot as shown in FIG. 2. In this way, NT3 is enabled to send upstream information packets at 622 Mbit/s, whilst NT2 sends at 155 Mbit/s, and only one frame format is used which is suited for both speeds.

It should be noted that although the above described network of the chosen embodiment is an asynchronous transfer mode ATM network the application of the present invention is not restricted to the field of ATM. Small modifications, evident to a person skilled in the art may be applied to the above described embodiment to adapt it to be method to divide upstream timeslots integrated in other time division multiple access networks wherein physical layer operation and maintenance parts are predefined in downstream information packets.

While the principles of the invention have been described above in connection with specific apparatus, it is to be clearly understood that this description is made only by way of example and not as a limitation on the scope of the invention, as defined in the appended claims.

What is claimed is:

1. A method for dividing upstream timeslots in a multiple access system comprising a line terminator coupled to a plurality of network terminators, said line terminator distributing downstream packets to said plurality of network terminators, wherein said method comprises:
   inserting a grant associated with one of said plurality of network terminators into said downstream packets, wherein said line terminator inserts said grant at a predefined location in a downstream packet, and distributing said downstream packet, and
   transmitting an upstream packet in one of a plurality of first or second predefined upstream timeslots, wherein a plurality of said second predefined upstream timeslots are interposed between each of said first predefined upstream timeslot, and wherein each of said network terminators transmits an upstream packet in response to reception and recognition of its associated grant, wherein transmitting further comprises:
      transmitting an upstream packet in a first predefined timeslot if said network terminator recognizing its associated grant is a lower order network terminator and said predefined location is a non-idle grant,
      transmitting an upstream packet in one of said second predefined timeslots if said network terminator recognizing its associated grant is a higher order network terminator and said predefined location is a non-idle grant, and
      transmitting an upstream packet in one of said second predefined timeslots if said network terminator recognizing its associated grant is a higher order network terminator and said predefined location is an idle grant.

2. A line terminator for division of upstream timeslots in a time division multiple access system comprising said line terminator coupled to a plurality of network terminators and wherein said line terminator distributes downstream packets to said plurality of network terminators, said line terminator comprising:
   an insertion device that inserts a grant associated with one of said plurality of network terminators in a downstream packet at a predefined first location associated with non-idle, grants, wherein if said network terminator
   is a higher order network terminator, said insertion device includes a grant at a predefined second location of said downstream data packet associated with idle grants.

3. A network terminator for time division multiple access system, said network terminator being one of a plurality of network terminators coupled to a line terminator, said network terminator comprising:
   recognition means that recognize an associated grant in a downstream packet sent from said line terminator to said network terminator, and
   transmitting means to transmit a packet in a predefined upstream timeslot upon recognition of said associated grant, wherein
   said network terminator transmits upstream packets at a higher order packt rate, and
   said recognition means recognizes its associated grant at a predefined first location association with non-idle grants and said transmitting means transmits a packet, upon recognition by said recognition means of said associated grant at said predefined first location, in one of a plurality of higher order timeslots, wherein said predefined upstream timeslot comprises a predefined number of higher order timeslots, and
   said recognition means recognizing its associated grant at a predefined second location associated with idle grants, and said transmitting means transmits a packet, upon recognition by said recognition means of said associated grant at said predefined second location in one of said higher order timeslot.

4. A method according to claim 1, wherein said time division multiple access system is a Passive Optical Network system and that said downstream data packets are Physical Layer Operation and Maintenance cells.

5. A method according to claim 4, wherein said first predefined location is a location within said Physical Layer Operation and Maintenance cells reserved for non-idle grants as specified in the ITU-T Recommendation G.983.1, whereas said second predefined location is a location within said Physical Layer Operation and Maintenance cells reserved to idle grants as specified in the ITU-T Recommendation G.983.1.

6. A method for dividing upstream timeslots in a multiple access system comprising a line terminator coupled to a plurality of network terminators, said line terminator distributing downstream packets to said plurality of network terminators, wherein said method comprises:
   inserting a grant associated with one of said plurality of network terminators into said downstream packets, wherein said line terminator inserts said grant at a predefined location within said downstream packets, and
   transmitting an upstream packet in one of a plurality of first or second predefined upstream timeslots, wherein n number of said second predefined upstream timeslots are interposed between each of said first predefined upstream timeslot, and wherein each of said network terminators transmits an upstream packet in response to reception and recognition of its associated grant, wherein transmitting further comprises:

transmitting an upstream packet in a first predefined timeslot if said network terminator recognizing its associated grant is a low data rate network terminator and said predefined location is a non-idle grant location, transmitting an upstream packet in one of said second predefined timeslots if said network terminator recognizing its associated grant is a high data rate network terminator and said predefined location is a non-idle grant location, and transmitting an upstream packet in one of said second predefined timeslots if said network terminator recognizing its associated grant is a high data rate network terminator and said predefined location is an idle grant location.

7. The method as claimed in claim 6, wherein the time period of n number of second predefined upstream timeslots is equal to the time period of one first predefined upstream timeslot.

8. The method as claimed in claim 6, wherein said downstream packets are Physical Layer Operation and Maintenance cells.

9. The method as claimed in claim 8, wherein said predefined locations for non-idle grants and for idle grants in said Physical Layer Operation and Maintenance cells are specified in the ITU-T Recommendation G.983.1.

10. A line terminator as claimed in claim 2, further comprising a queuing means that provides said grant for inclusion in said downstream packet to said insertion device based on bandwidth requests.

11. The method as claimed in claim 2, wherein said downstream packets are Physical Layer Operation and Maintenance cells.

12. The method as claimed in claim 11, wherein said predefined first location in said Physical Layer Operation and Maintenance cells is specified in the ITU-T Recommendation G.983.1 and said predefined second location in said Physical Layer Operation and Maintenance cells is specified in the ITU-T Recommendation G.983.1.

* * * * *